United States Patent
Li et al.

(10) Patent No.: US 9,437,861 B2
(45) Date of Patent: Sep. 6, 2016

(54) LITHIUM-ION SECONDARY BATTERY HAVING A SHORT-CIRCUIT TRIGGERING FUNCTION

(71) Applicant: Ningde Amperex Technology Limited, Ningde (CN)

(72) Inventors: Quankun Li, Ningde (CN); Peng Wang, Ningde (CN); Pinghua Deng, Ningde (CN); Junzhong Hu, Ningde (CN); Jibin Geng, Ningde (CN); Kai Wu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 150 days.

(21) Appl. No.: 14/292,329

(22) Filed: May 30, 2014

(65) Prior Publication Data

US 2015/0004447 A1 Jan. 1, 2015

(30) Foreign Application Priority Data

Jul. 1, 2013 (CN) .......................... 2013 1 0273345

(51) Int. Cl.
| | |
|---|---|
| *H01M 2/34* | (2006.01) |
| *H01M 2/02* | (2006.01) |
| *H01M 2/26* | (2006.01) |
| *H01M 10/052* | (2010.01) |

(52) U.S. Cl.
CPC ............... *H01M 2/34* (2013.01); *H01M 2/024* (2013.01); *H01M 2/027* (2013.01); *H01M 2/028* (2013.01); *H01M 2/26* (2013.01); *H01M 10/052* (2013.01); *H01M 2220/20* (2013.01); *Y02E 60/122* (2013.01)

(58) Field of Classification Search
CPC ....................................................... H01M 2/34
See application file for complete search history.

(56) References Cited

U.S. PATENT DOCUMENTS

| | | | | |
|---|---|---|---|---|
| 2011/0183193 A1* | 7/2011 | Byun | ................... | H01M 2/0426 429/178 |
| 2011/0244281 A1* | 10/2011 | Byun | ....................... | H01M 2/22 429/62 |
| 2011/0305928 A1* | 12/2011 | Kim | ................... | H01M 10/0431 429/61 |
| 2012/0189884 A1* | 7/2012 | Guen | ................... | H01M 2/0473 429/82 |
| 2012/0308879 A1* | 12/2012 | Kim | .................... | H01M 2/0207 429/186 |

FOREIGN PATENT DOCUMENTS

CN 102088113 A 6/2011

\* cited by examiner

*Primary Examiner* — Carlos Barcena
(74) *Attorney, Agent, or Firm* — Morgan, Lewis & Bockius LLP

(57) ABSTRACT

The present disclosure provides a lithium-ion secondary battery, having a case made from a conductive material; a cell received in the case; a cap assembly mounted to the case in a sealing way and equipped with electrode posts electrically connected to the cell, the electrode posts are a positive post and a negative electrode post; an electrolyte injected in the case; and at least one adapter member. Each adapter member is made from a conductive material and it has a connection portion fixedly connected to the corresponding one electrode post equipped to the cap assembly; and a contact portion extending downwardly into a space between the cell and the case from the connection portion at a lateral side of the cell. The contact portion contacts with the case to realize a short-circuit between the electrode posts when the case is crushed under an external force.

18 Claims, 5 Drawing Sheets

LITHIUM-ION SECONDARY BATTERY HAVING A SHORT-CIRCUIT TRIGGERING FUNCTION

CROSS-REFERENCE TO RELATED APPLICATIONS

The present application claims priority to Chinese patent application No. 201310273345.X filed on Jul. 1, 2013, which is incorporated herein by reference in its entirety.

TECHNICAL FIELD OF THE PRESENT DISCLOSURE

The present disclosure relates to a battery, and particularly relates to a lithium-ion secondary battery.

BACKGROUND OF THE PRESENT DISCLOSURE

A lithium-ion secondary battery has begun to be used in electric transportation means (for example, electric vehicles) for providing power under its high energy, high capacity and high power. Electrochemical performance of the lithium-ion secondary battery is improved, while safety of the lithium-ion secondary battery as a power source in the electric vehicles must be strictly ensured. The lithium-ion secondary battery should pass abuse test under harsh conditions for meeting requirements on safety performance in practical use, and three extreme safety tests including nail penetration, crush test and overcharge are generally performed.

In the crush test of the lithium-ion secondary battery, a positive electrode plate and a negative electrode plate contact with each other directly or through a non-insulative medium at local regions inside the lithium-ion secondary battery, an internal short-circuit occurs in the lithium-ion secondary battery. As many short-circuit points and large short-circuit current are generated in the crushing, decomposition and gas production of the electrolyte and internal overheating in the lithium-ion secondary battery will be caused, which may cause fire and explosion of the lithium-ion secondary battery.

In order to solve the above problems, a design idea in the prior art is to allow an external short-circuit to occur in the lithium-ion secondary battery before the internal short circuit occurs in the lithium-ion secondary battery, the large current generated from external short-circuit rapidly releases internal energy of a cell of the lithium-ion secondary battery, so as to ensure that the lithium-ion secondary battery has not energy enough to cause fire and explosion after the internal short-circuit.

A rechargeable safe battery capable of improving anti-puncturing and anti-crushing performance is disclosed in Chinese patent application publication No. CN102088113A, published on Jun. 8, 2011 in which two conductive support plates are disposed between a case and an electrode assembly. Under a normal condition, the two support plates are respectively electrically connected to a positive electrode and a negative electrode of the lithium-ion secondary battery, and are insulated from the case; when the lithium-ion secondary battery is punctured or crushed, the two conductive support plates establish an electrical connection, namely a short-circuit is realized between the positive electrode and the negative electrode of the lithium-ion secondary battery. As the conductive support plate is made from a conductive metal having a very low resistance, when the conductive support plates are short-circuiting, a large current is generated. Therefore heat generated by the large current is rapidly released to outside, so as to avoid that the heat generated by the large current when the lithium-ion secondary battery is internal short-circuiting is accumulated in the lithium-ion secondary battery, and so as to effectively eliminate potential hazard.

The above design has many deficiencies in practical use, especially in the practical crushing process, as an insulative layer (generally is an insulative film) between the two conductive plates has a certain toughness, it can not be ensured that the electrical connection between the two conductive support plates is realized before the internal short-circuit caused by crushing.

SUMMARY OF THE PRESENT DISCLOSURE

In view of the problem existing in the background of the present disclosure, an object of the present disclosure is to provide a lithium-ion secondary battery, when the lithium-ion secondary battery is squeezed, an external short-circuit occurs when crushing occurs, so as to allow the cell safe enough, ensure that no fire or explosion of the lithium-ion secondary battery occurs, and improve safety of the lithium-ion secondary battery.

In order to achieve the above object, the present disclosure provides a lithium-ion secondary battery, which comprises: a case made from a conductive material; a cell received in the case; a cap assembly mounted to the case in a sealing way and equipped with electrode posts electrically connected to the cell, the electrode posts are a positive electrode post and a negative electrode post; an electrolyte injected in the case; and at least one adapter member, the each adapter member is made from a conductive material. The each adapter member comprises: a connection portion fixedly connected to the corresponding one electrode post equipped to the cap assembly; and a contact portion extending downwardly into a space between the cell and the case from the connection portion at a lateral side of the cell, the contact portion contacts with the case to realize a short-circuit between the positive electrode post and the negative electrode post when the case is crushed under an external force.

The present disclosure has the following beneficial effects:

As the adapter member is used, when the lithium-ion secondary battery is squeezed, the case is deformed at a position where the case is squeezed, the contact portion of the adapter member contacts with the case when the case is crushed, so as to realize the short-circuit between the positive electrode post and the negative electrode post, allow the cell safe enough, ensure that no fire or explosion of the lithium-ion secondary battery occurs, and improve safety of the lithium-ion secondary battery.

Figure 1:
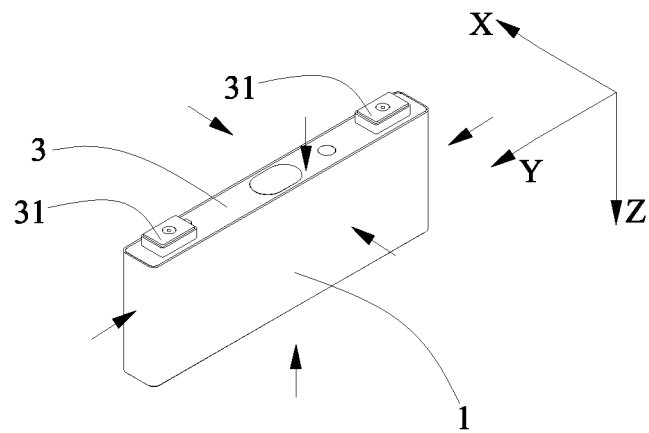
FIG. 1 is a perspective view of a lithium-ion secondary battery after assembling according to the present disclosure, six arrows showing the direction in which the lithium-ion secondary battery may be squeezed.
Figure 2:
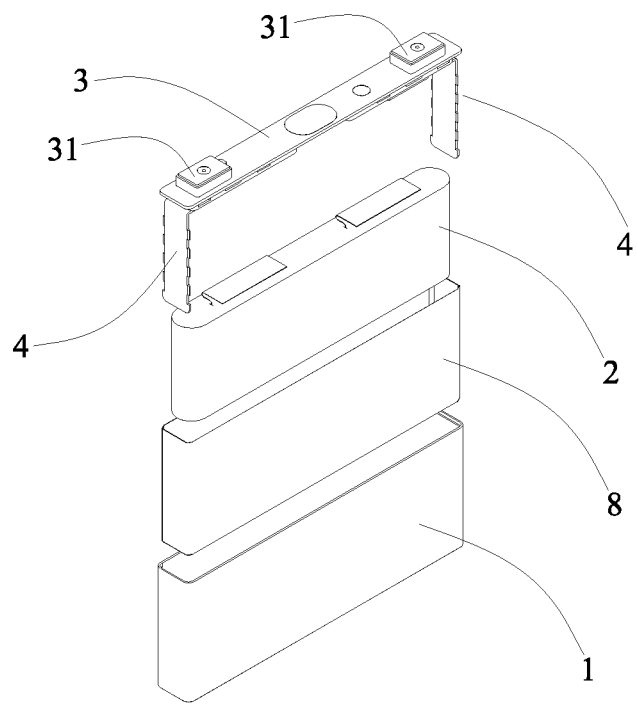
FIG. 2 is an exploded perspective view of the lithium-ion secondary battery according to the present disclosure.
Figure 3:
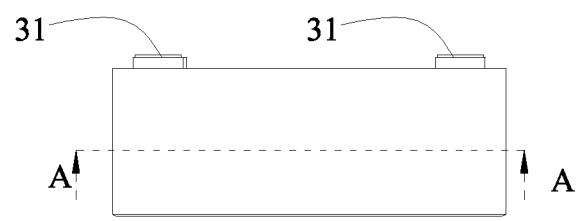
FIG. 3 is a front view of FIG. 1.

Reference numerals of the embodiments are represented as follows:

| |
|---|
| 1 case |
| 2 cell |
|     D2 width |
| 3 cap assembly |
|     31 electrode post |
| 4 adapter member |
|     41 connection portion |
|     42 contact portion |
|         421 side edge |
|         422 protruded portion |
|         423 outer surface |
|         424 recessed portion |
|         425 projection |
|             4251 top portion |
|         426 bottom surface |
|         427 grooved portion |
|         428 protrusion |
|             4281 top portion |
|     43 opening |
|     D1 width |
| 5 brittle material |
| 6 connecting piece |
| 7 support member |
| 8 insulative film |

DETAILED DESCRIPTION

Hereinafter a lithium-ion secondary battery according to the present disclosure will be described in details in combination with the Figures.

Referring to FIGS. 1-17, a lithium-ion secondary battery according to the present disclosure comprises: a case 1 made from a conductive material; a cell 2 received in the case 1; a cap assembly 3 mounted to the case 1 in a sealing way and equipped with electrode posts 31 electrically connected to the cell 2, the electrode posts 31 are a positive electrode post and a negative electrode post (both are represented by reference numeral 31); an electrolyte (not shown) injected in the case 1; and at least one adapter member 4, the each adapter member 4 is made from a conductive material. The each adapter member 4 comprises: a connection portion 41 fixedly connected to the corresponding one electrode post 31 equipped to the cap assembly 3; and a contact portion 42 extending downwardly into a space between the cell 2 and the case 1 from the connection portion 41 at a lateral side of the cell 2, the contact portion 42 contacts with the case 1 to realize a short-circuit between the positive electrode post and the negative electrode post when the easel is crushed under an external force.

The conductive material for making the case 1 may be a metal material such as aluminum.

Figure 7:
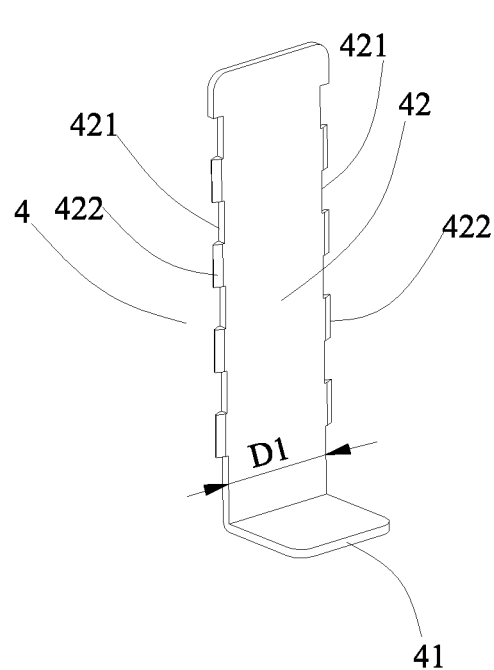
FIG. 7 is a perspective view of an embodiment of the adapter member of the lithium-ion secondary battery according to the present disclosure.

In an embodiment of the adapter member 4, referring to FIG. 7, the contact portion 42 of the adapter member 4 is provided with protruded portions 422 protruding in opposite directions at two side edges 421 thereof, the protruded portion 422 of the contact portion 42 contacts with the case 1 to realize the short-circuit between the positive electrode post and the negative electrode post when the case 1 is crushed under the external force. In another embodiment of the adapter member 4, a sum of protruding widths of the two protruded portions 422 and a width D1 of the adapter member 4 may be greater than a width D2 of the cell 2. The protruded portion 422 of the contact portion 42 contacts with the case 1 so as to realize the short-circuit between the positive electrode post and the negative electrode post when the case 1 is crushed under the external force. Of course, it is not limited to that, the sum of the protruding width of the two protruded portions 422 and the width D1 of the adapter member 4 may be less than or equal to the width D2 of the cell 2, as long as the protruded portion 422 of the contact portion 42 contacts with the case 1 prior to the internal short-circuit (namely crushing) caused by deformation of the cell to allow the short-circuit between the positive electrode post and the negative electrode post. Preferably, a shape of the protruded portion 422 is a zigzag or a raised arc, but it is not limited to that, as long as the protruded portion 422 can rapidly contact with the case 1 when the case 1 is crushed under the external force.

Figure 8:
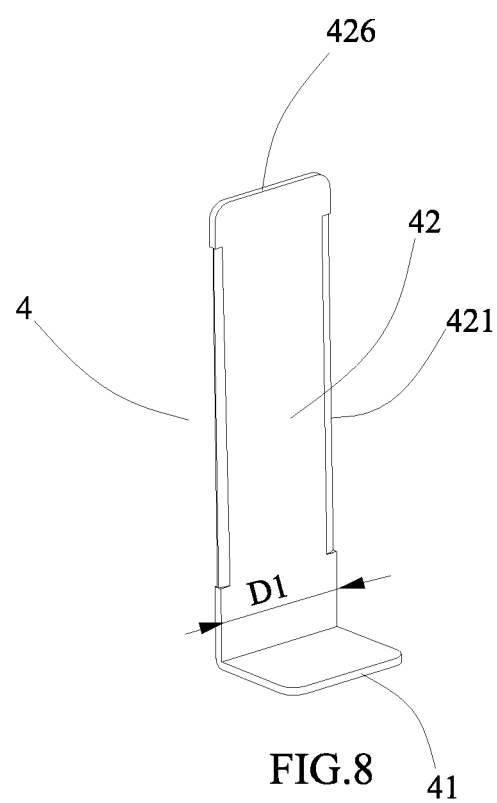
FIG. 8 is a perspective view of another embodiment of the adapter member of the lithium-ion secondary battery according to the present disclosure.
Figure 9:
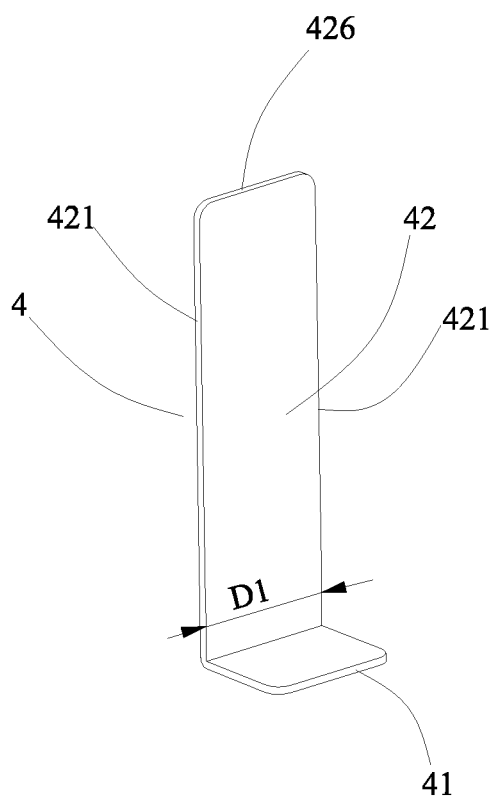
FIG. 9 is a perspective view of another embodiment of the adapter member of the lithium-ion secondary battery according to the present disclosure.

In another embodiment of the adapter member 4, referring to FIG. 8 and FIG. 9, the width D1 (namely a distance between the two side edges 421) of the adapter member 4 may be greater than the width D2 of the cell 2, when the case 1 is crushed under the external force, the contact portion 42 of the adapter member 4 contacts with the case 1, so as to realize the short-circuit between the positive electrode post and the negative electrode post. The width D1 of the adapter member 4 is greater than the width D2 of the cell 2, when case 1 is crushed under the external force, the case 1 directly contacts with the adapter member 4, at this time the cell 2 is absolutely safe. In addition, as the adapter member 4 is wide, the compressive strength of the lithium-ion secondary battery can be improved. Of course, it is not limited to that, the width D1 of the adapter member 4 may also be less than or equal to the width D2 of the cell 2 (referring to FIG. 7), as long as the protruded portion 422 of the contact portion 42 contacts with the case 1 prior to the internal short-circuit (namely crushing) caused by deformation of the cell to realize the short-circuit between the positive electrode post and the negative electrode post. At this time, the contact portion 42 of the adapter member 4 may not be provided with the protruded portion 422 as shown in FIG. 7, of course, it is not limited to that, the protruded portion 422 may be further provided on this basis. In another embodiment of the adapter member 4, referring to FIG. 8 and FIG. 9, two side edges 421 of the contact portion 42 of the adapter member 4 between a bottom surface 426 and the connection portion 41 are blade-shaped.

Figure 10:
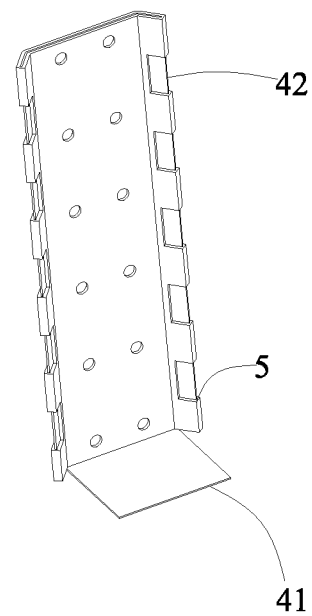
FIG. 10 is a perspective view of another embodiment of the adapter member of the lithium-ion secondary battery according to the present disclosure.
Figure 11:
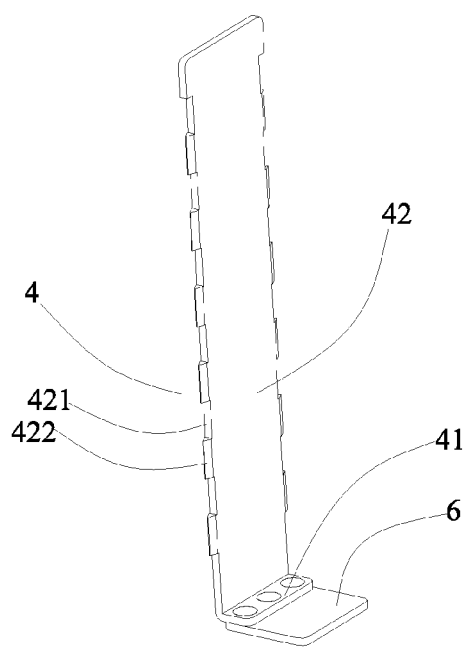
FIG. 11 is a perspective view of another embodiment of the adapter member of the lithium-ion secondary battery according to the present disclosure.
Figure 12:
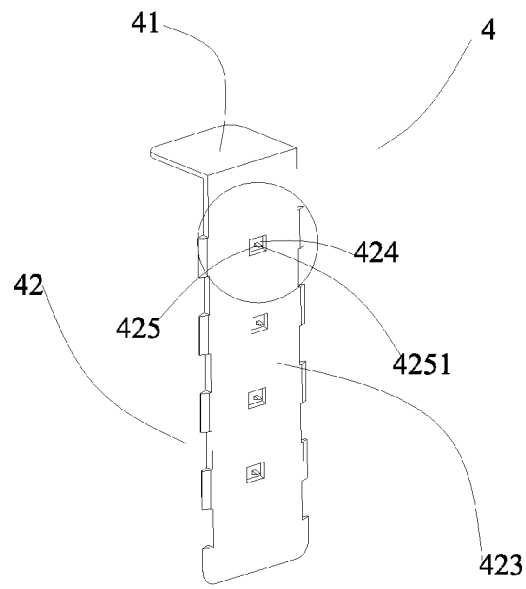
FIG. 12 is a perspective view of another embodiment of the adapter member of the lithium-ion secondary battery according to the present disclosure.
Figure 13:
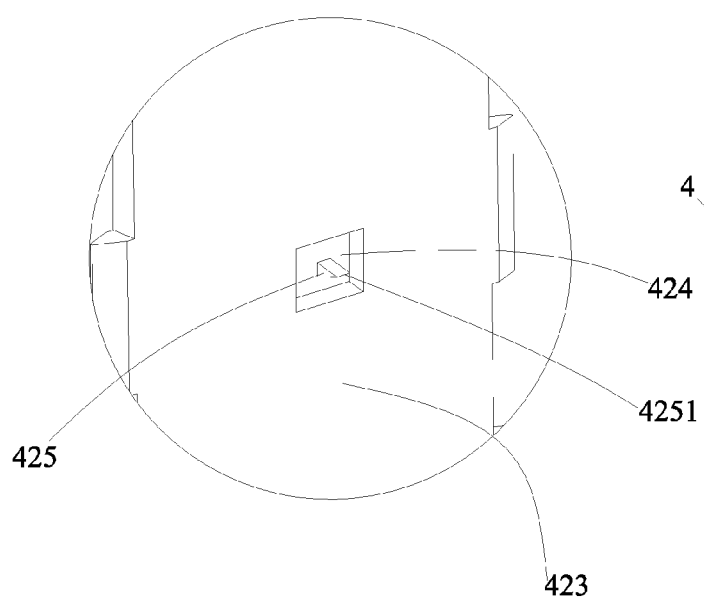
FIG. 13 is an enlarged view of a circled portion of FIG. 12.

In another embodiment of the adapter member 4, referring to FIG. 10, the adapter member 4 is covered with a layer of brittle material 5 which is electrolyte-resistant, the brittle material 5 is broken to allow the contact portion 42 to contact with the case 1 so as to realize the short-circuit between the positive electrode post and the negative electrode post when the case 1 is crushed under the external force. The brittle material 5 may be polyphenylene sulfide (PPS), but it is not limited to that. It should be noted that, the adapter member 4 covered with the brittle material 5 may be but is not limited to the shape as shown in FIGS. 7-9, FIG. 11, FIG. 12, FIG. 14, and FIG. 16.

The conductive material for making the adapter member 4 can be a metal material such as copper, aluminum, nickel and stainless steel. In another embodiment of the adapter member 4, preferably, a material of the adapter member 4 is the same as a material of a current collector of an electrode plate of the cell 2 corresponding to the electrode post 31 electrically connected to the adapter member 4 (for example the adapter member 4 connected to the electrode post 31 which is negative adopts copper, the adapter member 4 connected to the electrode post 31 which is positive adopts aluminum), so as to ensure that no voltage drop is caused by material differences. In order to ensure that the adapter member 4 has a certain strength, in another embodiment of the adapter member 4, referring to FIG. 11, the lithium-ion secondary battery further comprises: a connecting piece 6 fixedly connected (such as riveting and welding) to the connection portion 41 of the adapter member 4 at one end thereof and fixedly connected to the corresponding electrode post 31 on the cap assembly 3 at the other end thereof. Preferably, the connecting piece 6 is made from a stainless steel material.

In the embodiments as shown in FIGS. 2-11 and FIGS. 16-17, the adapter member is for squeezing in X direction. For squeezing in Y direction (referring to FIG. 1), in another embodiment of the adapter member 4, referring to FIGS. 12-13, the contact portion 42 of the adapter member 4 is provided with a plurality of recessed portions 424 at an outer surface 423 thereof and a plurality of projections 425 respectively provided in the plurality of recessed portions 424, a top portion 4251 of the each projection 425 is flush with or lower than a plane where an opening of the corresponding recessed portion 424 is positioned. At this time, the contact portion 42 of the adapter member 4 contacts with the case 1 at the outer surface 423.

Figure 14:
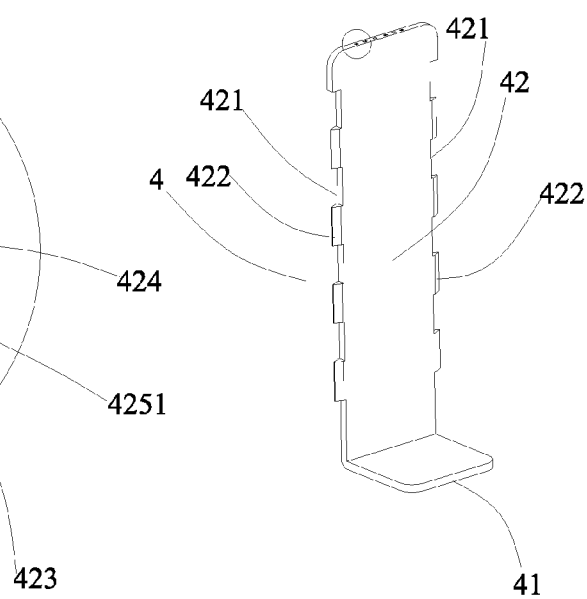
FIG. 14 is a perspective view of another embodiment of the adapter member of the lithium-ion secondary battery according to the present disclosure.
Figure 15:
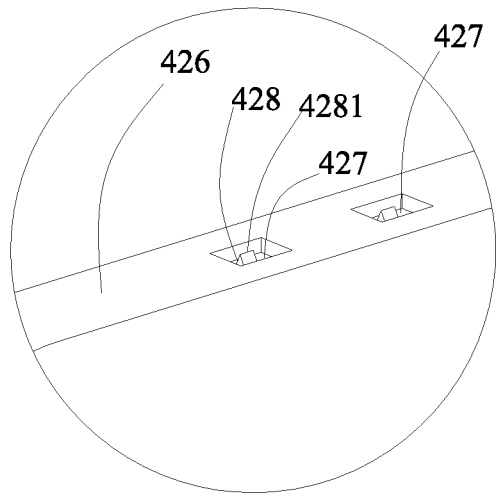
FIG. 15 is an enlarged view of the circled portion of FIG. 13.

For squeezing in Z direction (referring to FIG. 1), in another embodiment of the adapter member 4, referring to FIGS. 14-15, the contact portion 42 of the adapter member 4 is provided with a plurality of grooved portions 427 and a plurality of protrusions 428 respectively provided in the plurality of grooved portions 427 at a bottom surface 426, a top portion 4281 of the each protrusion 428 is flush with or lower than a plane where an opening of the corresponding grooved portion 427 is positioned. At this time, the contact portion 42 of the adapter member 4 contacts with the case 1 at the bottom surface 426.

Figure 16:
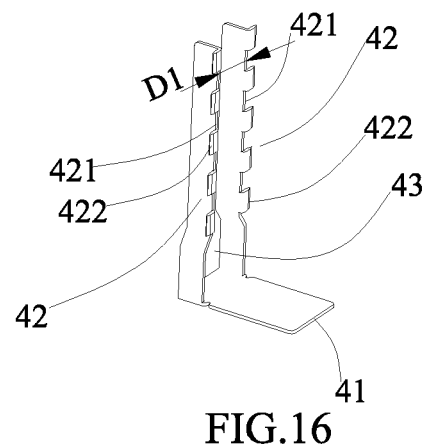
FIG. 16 is a perspective view of another embodiment of the adapter member of the lithium-ion secondary battery according to the present disclosure.
Figure 17:
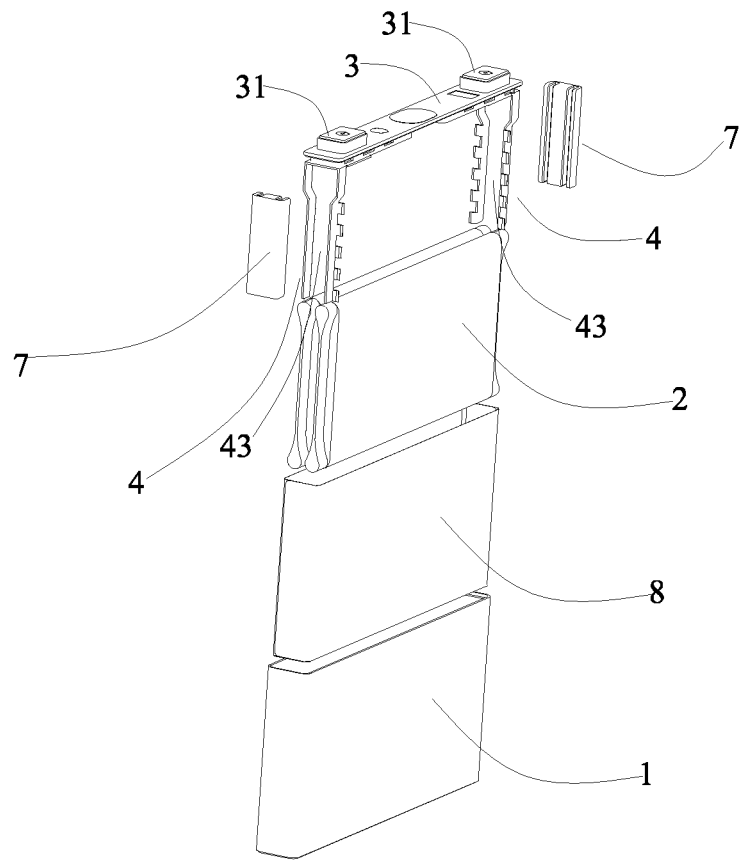
FIG. 17 is an exploded perspective view of the lithium-ion secondary battery utilizing the adapter member of FIG. 16 according to the present disclosure.

In another embodiment of the adapter member 4, referring to FIGS. 16-17, the adapter member 4 is provided with an opening 43 at the contact portion 42, a support member 7 is clamped in the opening 43. The support member 7 is clamped in the opening 43, which can improve the strength of the contact portion 42, so that when the case 1 is crushed under the external force, that the contact portion 42 contacts with the case 1 prior to the internal short-circuit (namely crushing) caused by deformation of the cell can be ensured. Preferably, the support member 7 is plastic.

In the lithium-ion secondary battery according to the present disclosure, the adapter member 4 can be provided as two in number, referring to FIG. 1 and FIG. 17, at this time, the two adapter members 4 are respectively electrically connected to the two electrode posts 31 (namely the positive electrode post and the negative electrode post), but the two adapter members 4 do not contact with the case 1 when the two adapter members 4 do not function, when the case 1 is crushed under the external force, one or two adapter members 4 contacts with the case 1, the short-circuit occurs between the positive and negative electrodes of the lithium-ion secondary battery because the case 1 is conductive. In an alternative embodiment, the adapter member 4 is provided as one in number, the corresponding electrode post 31 which is not connected to the adapter member 4 is electrically connected to the case 1. The electrical connection between the corresponding electrode post 31 which is not connected to the adapter member 4 and the case 1 can be realized by welding, of course, the electrical connection may also be realized by other methods (for example disposing a resistor for electrical conduction).

Figure 4:
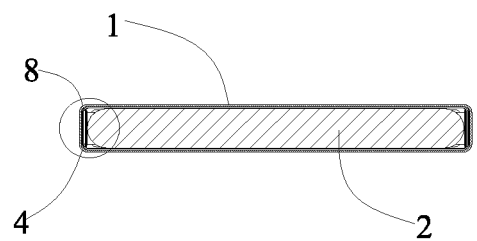
FIG. 4 is a cross-sectional view taken along a line A-A of FIG. 3.
Figure 5:
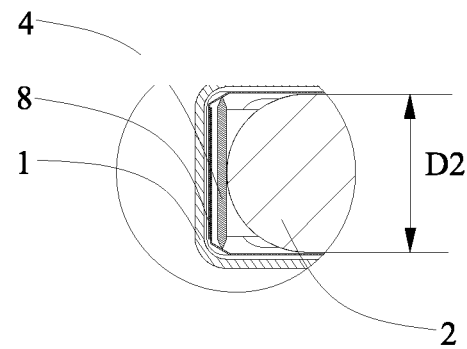
FIG. 5 is an enlarged view of a circled portion of FIG. 4.
Figure 6:
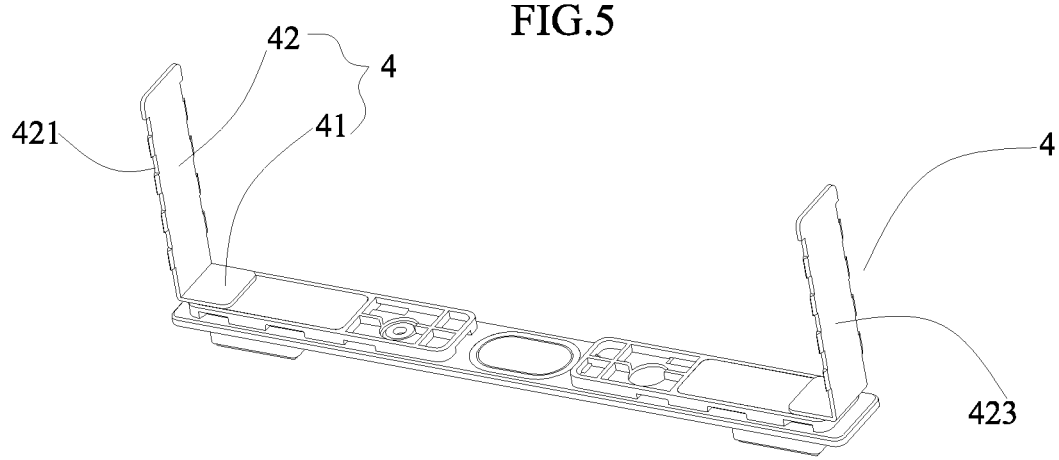
FIG. 6 is a perspective view showing connection between the adapter member and the cap assembly of the lithium-ion secondary battery according to the present disclosure.

In another embodiment of the lithium-ion secondary battery according to the present disclosure, referring to FIG. 4 and FIG. 5, the lithium-ion secondary battery may further comprise an insulative film 8 between the case 1 and the cell 2 and surrounding the adapter member 4, the contact portion 42 punctures the insulative film 8 to contact with the case 1, so as to realize the short-circuit between the positive electrode post and the negative electrode post when the case 1 is crushed under the external force. Preferably, the insulative film 8 is made from an electrolyte-resistant material, such as polypropylene (PP), polyethylene terephthalate (PET) or polyethylene (PE). Preferably, a thickness of the insulative film 8 is 0.03~0.3 mm. It should be noted that, when the lithium-ion secondary battery adopts the insulative film 8, the contact portion 42 of the adapter member 4 is provided with the protruded portions 422 at the two side edges 421 (the protruded portion 422 is not provided in FIG. 8 and FIG. 9 but the blade edge is adopted), the projection 425 is provided at the outer surface 423, the protrusion 428 is provided at the bottom surface 426, when the lithium-ion secondary battery is squeezed, the contact portion 42 will puncture the insulative film 8 in the corresponding squeezing direction via these structures, so that the contact portion 42 contacts with the case 1.

In the lithium-ion secondary battery according to the present disclosure, preferably, the electrode post 31, which is negative, of the cap assembly 3 is insulated from the case 1, an insulation resistance between the electrode post 31, which is negative, of the cap assembly 3 and the case 1 is greater than 2MΩ; the electrode post 31, which is positive, of the cap assembly 3 and the case 1 form an electrical connection, a resistance for the electrical connection between the electrode post 31, which is positive, of the cap assembly 3 and the case 1 is 0~10000Ω.

In the lithium-ion secondary battery according to the present disclosure, preferably, the positive electrode post and the negative electrode post of the lithium-ion secondary battery form the short-circuit through the electrical connection between the adapter member 4 and the case 1, and a short-circuit resistance is controlled within 3 mΩ.

While the present disclosure may be susceptible to embodiments in different forms, there are shown in the Figures, and herein will be described in details, specific embodiments with the understanding that the present disclosure is to be considered an exemplification of the principles of the present disclosure, and is not intended to limit the present disclosure to that as illustrated and described herein. Therefore, unless otherwise noted, features disclosed herein may be combined together to form additional combinations that were not otherwise shown for purposes of brevity. While the terms such as upper, lower, front, rear, left, right and the like are used herein, these terms are used for ease in describing the present disclosure and do not denote a particular required orientation for use of the present disclosure.

While embodiments of the present disclosure are shown and described herein, it is envisioned that those skilled in the art may devise various modifications, substitutions and variations of the present disclosure without departing from the spirit and scope of the appended claims.

What is claimed is:

1. A lithium-ion secondary battery, comprising:
   a case made from a conductive material;
   a cell received in the case, the cell having two main surfaces and two lateral sides;
   a cap assembly mounted to the case in a sealing way and equipped with electrode posts electrically connected to the cell, the electrode posts being a positive electrode post and a negative electrode post; and
   an electrolyte injected in the case;
   at least one adapter member, the each adapter member being made from a conductive material, and the each adapter member comprising:
   a connection portion fixedly connected to the corresponding one electrode post equipped to the cap assembly; and
   a pair of contact portions extending downwardly into a space between the cell and the case from the connection portion at a lateral side of the cell, each contact portion contacting with the case to realize a short-circuit between the positive electrode post and the negative electrode post when the case is crushed under an external force; and
   an insulative film located between the case and the cell and surrounding the at least one adapter member,
   wherein the pair of contact portions each define a surface that is perpendicular to the two lateral sides of the cell and parallel to the two main surfaces of the cell, each contact portion is provided with protruded portions distributed along an edge of the contact portion and protruding out of the corresponding surface defined by the contact portion, the protruded portions of the pair of contact portions are configured to point in two opposite directions towards the case such that the protruded portions puncture the insulative film to contact with the case to realize the short-circuit between the positive electrode post and the negative electrode post when the case is crushed under the external force.

2. The lithium-ion secondary battery according to claim 1, wherein a shape of each protruded portion is a zigzag or a raised arc.

3. The lithium-ion secondary battery according to claim 1, wherein a sum of protruding widths of two protruded portions and a width of the adapter member is greater than a width of the cell.

4. The lithium-ion secondary battery according to claim 1, wherein each of the protruded portions are blade-shaped.

5. The lithium-ion secondary battery according to claim 1, wherein the adapter member is covered with a layer of breakable material which is electrolyte-resistant, the breakable material is broken to allow the contact portion to contact with the case so as to realize the short-circuit between the positive electrode post and the negative electrode post when the case is crushed under the external force.

6. The lithium-ion secondary battery according to claim 5, wherein breakable material is polyphenylene sulfide.

7. The lithium-ion secondary battery according to claim 1, wherein a material of the adapter member is the same as a material of a current collector of an electrode plate of the cell corresponding to the electrode post electrically connected to the adapter member.

8. The lithium-ion secondary battery according to claim 1, wherein the adapter member is provided with an opening between the pair of contact portions, a support member (7) is clamped in the opening.

9. The lithium-ion secondary battery according to claim 1, wherein the adapter member is provided as two in number.

10. The lithium-ion secondary battery according to claim 1, wherein the adapter member is provided as one in number, the corresponding electrode post which is not connected to the adapter member is electrically connected to the case.

11. A lithium-ion secondary battery, comprising:
    a case made from a conductive material,
    a cell received in the case,
    a cap assembly mounted to the case in a sealing way and equipped with electrode posts electrically connected to the cell, the electrode posts being a positive electrode post and a negative electrode post, and
    an electrolyte injected in the case;
    the lithium-ion secondary battery further comprising:
    at least one adapter member, the each adapter member being made from a conductive material, and the each adapter member comprising:
    a connection portion fixedly connected to the corresponding one electrode post equipped to the cap assembly; and
    a contact portion extending downwardly into a space between the cell and the case from the connection portion at a lateral side of the cell, the contact portion contacting with the case to realize a short-circuit between the positive electrode post and the negative electrode post when the case is crushed under an external force,
    wherein the contact portion of the adapter member is provided with a plurality of recessed portions at an outer surface thereof and a plurality of projections respectively provided in the plurality of recessed portions, a top portion of the each projection is flush with or lower than a plane where an opening of the corresponding recessed portion is positioned.

12. The lithium-ion secondary battery according to claim 11, wherein the lithium-ion secondary battery further comprises:
    an insulative film between the case and the cell and surrounding the adapter member, the contact portion punctures the insulative film to contact with the case so as to realize the short-circuit between the positive electrode post and the negative electrode post when the case is crushed under the external force.

13. The lithium-ion secondary battery according to claim 11, wherein the adapter member is covered with a layer of breakable material which is electrolyte-resistant, the breakable material is broken to allow the contact portion to contact with the case so as to realize the short-circuit between the positive electrode post and the negative electrode post when the case is crushed under the external force.

14. The lithium-ion secondary battery according to claim 11, wherein a material of the adapter member is the same as a material of a current collector of an electrode plate of the cell corresponding to the electrode post electrically connected to the adapter member.

15. A lithium-ion secondary battery, comprising:
a case made from a conductive material;
a cell received in the case;
a cap assembly mounted to the case in a sealing way and equipped with electrode posts electrically connected to the cell, the electrode posts being a positive electrode post and a negative electrode post; and
an electrolyte injected in the case;
the lithium-ion secondary battery further comprising:
at least one adapter member, the each adapter member being made from a conductive material, and the each adapter member comprising:
a connection portion fixedly connected to the corresponding one electrode post equipped to the cap assembly; and
a contact portion extending downwardly into a space between the cell and the case from the connection portion at a lateral side of the cell, the contact portion contacting with the case to realize a short-circuit between the positive electrode post and the negative electrode post when the case is crushed under an external force,
wherein the contact portion of the adapter member is provided with a plurality of grooved portions and a plurality of protrusions respectively provided in the plurality of grooved portions at a bottom surface, a top portion of the each protrusion is flush with or lower than a plane where an opening of the corresponding grooved portion is positioned.

16. The lithium-ion secondary battery according to claim 15, wherein the lithium-ion secondary battery further comprises:
an insulative film between the case and the cell and surrounding the adapter member, the contact portion punctures the insulative film to contact with the case so as to realize the short-circuit between the positive electrode post and the negative electrode post when the case is crushed under the external force.

17. The lithium-ion secondary battery according to claim 15, wherein the adapter member is covered with a layer of breakable material which is electrolyte-resistant, the breakable material is broken to allow the contact portion to contact with the case so as to realize the short-circuit between the positive electrode post and the negative electrode post when the case is crushed under the external force.

18. The lithium-ion secondary battery according to claim 15, wherein a material of the adapter member is the same as a material of a current collector of an electrode plate of the cell corresponding to the electrode post electrically connected to the adapter member.

* * * * *